United States Patent
Nishitani et al.

(10) Patent No.: US 10,460,115 B2
(45) Date of Patent: *Oct. 29, 2019

(54) DATA ANONYMITY

(71) Applicant: International Business Machines Corporation, Armonk, NY (US)

(72) Inventors: Yusuke Nishitani, Tokyo (JP); Yutaka Oishi, Kanagawa (JP); Bat-Ulzii Tsend-Ochir, Tokyo (JP); Xiaoshuang Xu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 191 days.

This patent is subject to a terminal disclaimer.

(21) Appl. No.: 15/595,300

(22) Filed: May 15, 2017

(65) Prior Publication Data

US 2018/0330104 A1  Nov. 15, 2018

(51) Int. Cl.
*G06F 21/60* (2013.01)
*G06F 1/18* (2006.01)
*G06F 21/62* (2013.01)
*G06F 16/27* (2019.01)
*G06F 16/28* (2019.01)

(52) U.S. Cl.
CPC ............ *G06F 21/602* (2013.01); *G06F 1/187* (2013.01); *G06F 21/6254* (2013.01); *G06F 16/278* (2019.01); *G06F 16/289* (2019.01)

(58) Field of Classification Search
CPC ....... G06F 21/60; G06F 21/602; H04W 12/02
USPC ................................................ 713/150–155
See application file for complete search history.

(56) References Cited

U.S. PATENT DOCUMENTS

| | | | |
|---|---|---|---|
| 7,266,268 B2* | 9/2007 | Challener | G11B 5/02 385/129 |
| 7,296,268 B2* | 11/2007 | Darling | G06F 9/5061 709/230 |
| 8,484,511 B2 | 7/2013 | Tidwell et al. | |
| 8,666,759 B2* | 3/2014 | Eckert | G06Q 50/22 705/2 |
| 8,943,079 B2 | 1/2015 | Huang et al. | |
| 9,049,259 B2 | 6/2015 | Rathod | |
| 9,129,119 B2 | 9/2015 | Burke et al. | |

(Continued)

FOREIGN PATENT DOCUMENTS

JP  2013-239118 A  11/2013

OTHER PUBLICATIONS

Byun, Ji-Won et al., "Efficient k-Anonymization Using Clustering Techniques", Springer-Verlag Berling Heidelberg, https://www.cs.purdue.edu/homes/ninghui/papers/clustering_dasfaa07.pdf, DASFAA 2007, LNCS 4443, (month unknown) 2007, pp. 188-200.

(Continued)

*Primary Examiner* — Lynn D Feild
*Assistant Examiner* — Viral S Lakhia
(74) *Attorney, Agent, or Firm* — Francis Lammes; Stephen J. Walder, Jr.; Ryan G. Lewis

(57) ABSTRACT

The present invention may be a method, a system, and a computer program product. An embodiment of the present invention provides a method for ensuring anonymity of data. The method comprises the following: determining the number of members of each cluster, based on one or more features of leaving of the members of the data; and anonymizing the data in the database, using the determined number.

14 Claims, 15 Drawing Sheets

(56) References Cited

U.S. PATENT DOCUMENTS

| | | | |
|---|---|---|---|
| 9,135,320 B2 | 9/2015 | Goyal et al. | |
| 9,626,525 B2* | 4/2017 | Momchilov | H04L 63/0815 |
| 9,710,671 B1 | 7/2017 | Wiggins | |
| 9,785,795 B2 | 10/2017 | Grondin et al. | |
| 9,910,902 B1* | 3/2018 | Kramer | G06F 16/2272 |
| 2003/0041138 A1* | 2/2003 | Kampe | H04L 41/0893 709/223 |
| 2010/0070306 A1* | 3/2010 | Dvorak | G06Q 50/22 705/3 |
| 2011/0060905 A1* | 3/2011 | Stack | G06Q 10/10 713/167 |
| 2014/0059695 A1* | 2/2014 | Parecki | G06F 21/60 726/26 |
| 2014/0165133 A1* | 6/2014 | Foley | H04L 63/14 726/1 |
| 2014/0172854 A1* | 6/2014 | Huang | G06F 21/6245 707/737 |
| 2014/0380498 A1* | 12/2014 | Toyoda | G06F 21/6254 726/27 |
| 2015/0046745 A1* | 2/2015 | Dhavale | G06F 3/0647 714/4.11 |
| 2015/0106957 A1 | 4/2015 | Holman et al. | |
| 2016/0021024 A1* | 1/2016 | Parikh | G06F 9/45558 709/226 |
| 2016/0277435 A1* | 9/2016 | Salajegheh | H04L 63/1416 |
| 2017/0116552 A1* | 4/2017 | Deodhar | G06Q 10/06316 |
| 2017/0161439 A1* | 6/2017 | Raduchel | G06Q 10/063 |
| 2017/0161519 A1* | 6/2017 | Takahashi | G06F 19/00 |
| 2017/0221081 A1* | 8/2017 | Ollikainen | G06Q 30/0201 |
| 2017/0237747 A1 | 8/2017 | Quinn et al. | |
| 2018/0004978 A1* | 1/2018 | Hebert | G06F 16/2457 |
| 2018/0061259 A1* | 3/2018 | Ng | G09B 7/00 |
| 2018/0081913 A1* | 3/2018 | Suleiman | G06F 11/3452 |
| 2018/0102938 A1* | 4/2018 | Yoon | G06F 9/546 |
| 2018/0102952 A1* | 4/2018 | Gopalakrishnan | H04L 43/08 |
| 2018/0268135 A1* | 9/2018 | Nachenberg | G06F 21/552 |
| 2018/0276393 A1* | 9/2018 | Allen | G06F 3/0482 |
| 2018/0330104 A1* | 11/2018 | Nishitani | G06F 1/187 |

OTHER PUBLICATIONS

Pei, Jian et al., "Maintaining K-Anonymity against Incremental Updates", IEEE, SSBDM'07, https://www.cs.sfu.ca/~jpei/publications/incremental-anonymization-ssdbm.pdf, 19th International Conference on Scientific and Statistical Database Management, Jul. 9, 2007, 10 pages.

Takahashi, Tsubasa, "A Study on Data Anonymization for Series Data", University of Tsukuba Library, Doctor of Philosophy in Engineering, PhD Thesis, (Abstract Only) Mar. 2014, 4 pages.

Xu, Xiaoshuang et al., "An efficient generalized clustering method for achieving k-anonymization", IEEE, 2015 Third International Symposium on Computing and Networking (CANDAR), Dec. 8, 2015, 4 pages.

Yin, Chunyong et al., "An improved anonymity model for big data security based on clustering algorithm", John Wiley & Sons, Ltd., http://onlinelibrary.wiley.com/doi/10.1002/cpe.3902/full, Wiley Online Library, Concurrency and Computation: Practice and Experience, Special Issue Paper, vol. 29, Issue 7, Published online Jun. 23, 2016, 13 pages.

List of IBM Patents or Patent Applications Treated as Related, Nov. 15, 2017, 2 pages.

* cited by examiner

| FAMILY NAME | GENDER | AGE | OPERATION DATE | DISORDER |
| --- | --- | --- | --- | --- |
| SMITH | MALE | 15 | 07/12/2015 | CANCER |
| JOHNSON | MALE | 16 | 08/01/2015 | CANCER |
| WILLIAMS | MALE | 29 | 07/15/2015 | CANCER |
| BROWN | FEMALE | 25 | 09/15/2015 | CANCER |
| JONES | FEMALE | 33 | 07/27/2016 | CANCER |
| MILLER | FEMALE | 39 | 03/15/2016 | CANCER |
| DAVIS | FEMALE | 25 | 04/21/2016 | CANCER |
| GARCIA | MALE | 34 | 05/01/2016 | CANCER |
| RODRIGUEZ | MALE | 37 | 04/15/2014 | CANCER |
| WILSON | FEMALE | 43 | 06/01/2014 | CANCER |
| MARTINEZ | FEMALE | 60 | 03/12/2014 | CANCER |
| ANDERSON | MALE | 34 | 03/21/2014 | CANCER |
| TAYLOR | MALE | 56 | 04/05/2013 | CANCER |
| THOMAS | FEMALE | 29 | 04/20/2013 | CANCER |
| HERNANDEZ | MALE | 45 | 05/15/2013 | CANCER |
| MOORE | MALE | 51 | 09/11/2013 | CANCER |
| MARTIN | FEMALE | 46 | 09/21/2012 | CANCER |
| JACKSON | MALE | 70 | 10/11/2012 | CANCER |
| THOMPSON | FEMALE | 49 | 11/01/2012 | CANCER |
| WHITE | MALE | 52 | 11/15/2012 | CANCER |

*FIG. 2*

| ID | FAMILY NAME | GENDER | AGE | OPERATION DATE | DISORDER | CLUSTER |
|---|---|---|---|---|---|---|
| 1 | SMITH | MALE | 15 | 07/12/2015 | CANCER | 1 |
| 2 | JOHNSON | MALE | 16 | 08/01/2015 | CANCER | 1 |
| 3 | WILLIAMS | MALE | 29 | 07/15/2015 | CANCER | 2 |
| 4 | BROWN | FEMALE | 25 | 09/15/2015 | CANCER | 1 |
| 5 | JONES | FEMALE | 33 | 07/27/2016 | CANCER | 1 |
| 6 | MILLER | FEMALE | 39 | 03/15/2016 | CANCER | 2 |
| 7 | DAVIS | FEMALE | 25 | 04/21/2016 | CANCER | 1 |
| 8 | GARCIA | MALE | 34 | 05/01/2016 | CANCER | 2 |
| 9 | RODRIGUEZ | MALE | 37 | 04/15/2014 | CANCER | 2 |
| 10 | WILSON | FEMALE | 43 | 06/01/2014 | CANCER | 2 |
| 11 | MARTINEZ | FEMALE | 60 | 03/12/2014 | CANCER | 1 |
| 12 | ANDERSON | MALE | 34 | 03/21/2014 | CANCER | 1 |
| 13 | TAYLOR | MALE | 56 | 04/05/2013 | CANCER | 1 |
| 14 | THOMAS | FEMALE | 29 | 04/20/2013 | CANCER | 2 |
| 15 | HERNANDEZ | MALE | 45 | 05/15/2013 | CANCER | 2 |
| 16 | MOORE | MALE | 51 | 09/11/2013 | CANCER | 1 |
| 17 | MARTIN | FEMALE | 46 | 09/21/2012 | CANCER | 1 |
| 18 | JACKSON | MALE | 70 | 10/11/2012 | CANCER | 2 |
| 19 | THOMPSON | FEMALE | 49 | 11/01/2012 | CANCER | 2 |
| 20 | WHITE | MALE | 52 | 11/15/2012 | CANCER | 2 |

| ID | FAMILY NAME | GENDER | AGE | OPERATION DATE | DISORDER | CLUSTER |
|---|---|---|---|---|---|---|
| 1 | SMITH | MALE | 15 | 07/12/2015 | CANCER | 1 |
| 2 | JOHNSON | MALE | 16 | 08/01/2015 | CANCER | 1 |
| 3 | WILLIAMS | MALE | 29 | 07/15/2015 | CANCER | 2 |
| 4 | BROWN | FEMALE | 25 | 09/15/2015 | CANCER | 1 |
| 5 | JONES | FEMALE | 33 | 07/27/2016 | CANCER | 1 |
| 6 | MILLER | FEMALE | 39 | 03/15/2016 | CANCER | 2 |
| 7 | DAVIS | FEMALE | 25 | 04/21/2016 | CANCER | 1 |
| 8 | GARCIA | MALE | 34 | 05/01/2016 | CANCER | 2 |
| 9 | RODRIGUEZ | MALE | 37 | 04/15/2014 | CANCER | 2 |
| 10 | WILSON | FEMALE | 43 | 06/01/2014 | CANCER | 2 |
| 11 | MARTINEZ | FEMALE | 60 | 03/12/2014 | CANCER | 1 |
| 12 | ANDERSON | MALE | 34 | 03/21/2014 | CANCER | 1 |
| 13 | TAYLOR | MALE | 56 | 04/05/2013 | CANCER | 1 |
| 14 | THOMAS | FEMALE | 29 | 04/20/2013 | CANCER | 2 |
| 15 | HERNANDEZ | MALE | 45 | 05/15/2013 | CANCER | 2 |
| 16 | MOORE | MALE | 51 | 09/11/2013 | CANCER | 1 |
| 17 | ~~MARTIN~~ | ~~FEMALE~~ | ~~46~~ | ~~09/21/2012~~ | ~~CANCER~~ | ~~1~~ |
| 18 | ~~JACKSON~~ | ~~MALE~~ | ~~70~~ | ~~10/11/2012~~ | ~~CANCER~~ | ~~2~~ |
| 19 | ~~THOMPSON~~ | ~~FEMALE~~ | ~~49~~ | ~~11/01/2012~~ | ~~CANCER~~ | ~~2~~ |
| 20 | ~~WHITE~~ | ~~MALE~~ | ~~52~~ | ~~11/15/2012~~ | ~~CANCER~~ | ~~2~~ |

FIG. 3B

| ID | FAMILY NAME | GENDER | AGE | OPERATION DATE | DISORDER | CLUSTER |
|---|---|---|---|---|---|---|
| 1 | SMITH | MALE | 15 | 07/12/2015 | CANCER | 1 |
| 2 | JOHNSON | MALE | 16 | 08/01/2015 | CANCER | 1 |
| 3 | WILLIAMS | MALE | 29 | 07/15/2015 | CANCER | 2 |
| 4 | BROWN | FEMALE | 25 | 09/15/2015 | CANCER | 1 |
| 5 | JONES | FEMALE | 33 | 07/27/2016 | CANCER | 1 |
| 6 | MILLER | FEMALE | 39 | 03/15/2016 | CANCER | 2 |
| 7 | DAVIS | FEMALE | 25 | 04/21/2016 | CANCER | 1 |
| 8 | GARCIA | MALE | 34 | 05/01/2016 | CANCER | 2 |
| 9 | RODRIGUEZ | MALE | 37 | 04/15/2014 | CANCER | 2 |
| 10 | WILSON | FEMALE | 43 | 06/01/2014 | CANCER | 2 |
| 11 | MARTINEZ | FEMALE | 60 | 03/12/2014 | CANCER | 1 |
| 12 | ANDERSON | MALE | 34 | 03/21/2014 | CANCER | 1 |
| 13 | ~~TAYLOR~~ | ~~MALE~~ | ~~56~~ | ~~04/05/2013~~ | ~~CANCER~~ | ~~1~~ |
| 14 | ~~THOMAS~~ | ~~FEMALE~~ | ~~29~~ | ~~04/20/2013~~ | ~~CANCER~~ | ~~2~~ |
| 15 | ~~HERNANDEZ~~ | ~~MALE~~ | ~~45~~ | ~~05/15/2013~~ | ~~CANCER~~ | ~~2~~ |
| 16 | ~~MOORE~~ | ~~MALE~~ | ~~51~~ | ~~09/11/2013~~ | ~~CANCER~~ | ~~1~~ |

| ID | FAMILY NAME | GENDER | AGE | OPERATION DATE | DISORDER | CLUSTER |
|---|---|---|---|---|---|---|
| 1 | SMITH | MALE | 15 | 07/12/2015 | CANCER | 1 |
| 2 | JOHNSON | MALE | 16 | 08/01/2015 | CANCER | 1 |
| 3 | WILLIAMS | MALE | 29 | 07/15/2015 | CANCER | 1 |
| 4 | BROWN | FEMALE | 25 | 09/15/2015 | CANCER | 1 |
| 5 | JONES | FEMALE | 33 | 07/27/2016 | CANCER | 2 |
| 6 | MILLER | FEMALE | 39 | 03/15/2016 | CANCER | 2 |
| 7 | DAVIS | FEMALE | 25 | 04/21/2016 | CANCER | 2 |
| 8 | GARCIA | MALE | 34 | 05/01/2016 | CANCER | 2 |
| 9 | RODRIGUEZ | MALE | 37 | 04/15/2014 | CANCER | 3 |
| 10 | WILSON | FEMALE | 43 | 06/01/2014 | CANCER | 3 |
| 11 | MARTINEZ | FEMALE | 60 | 03/12/2014 | CANCER | 3 |
| 12 | ANDERSON | MALE | 34 | 03/21/2014 | CANCER | 3 |
| 13 | TAYLOR | MALE | 56 | 04/05/2013 | CANCER | 4 |
| 14 | THOMAS | FEMALE | 29 | 04/20/2013 | CANCER | 4 |
| 15 | HERNANDEZ | MALE | 45 | 05/15/2013 | CANCER | 4 |
| 16 | MOORE | MALE | 51 | 09/11/2013 | CANCER | 4 |
| 17 | MARTIN | FEMALE | 46 | 09/21/2012 | CANCER | 5 |
| 18 | JACKSON | MALE | 70 | 10/11/2012 | CANCER | 5 |
| 19 | THOMPSON | FEMALE | 49 | 11/01/2012 | CANCER | 5 |
| 20 | WHITE | MALE | 52 | 11/15/2012 | CANCER | 5 |

| ID | FAMILY NAME | GENDER | AGE | OPERATION DATE | DISORDER | CLUSTER |
|---|---|---|---|---|---|---|
| 1 | SMITH | MALE | 15 | 07/12/2015 | CANCER | 1 |
| 2 | JOHNSON | MALE | 16 | 08/01/2015 | CANCER | 1 |
| 3 | WILLIAMS | MALE | 29 | 07/15/2015 | CANCER | 1 |
| 4 | BROWN | FEMALE | 25 | 09/15/2015 | CANCER | 1 |
| 5 | JONES | FEMALE | 33 | 07/27/2016 | CANCER | 2 |
| 6 | MILLER | FEMALE | 39 | 03/15/2016 | CANCER | 2 |
| 7 | DAVIS | FEMALE | 25 | 04/21/2016 | CANCER | 2 |
| 8 | GARCIA | MALE | 34 | 05/01/2016 | CANCER | 2 |
| 9 | RODRIGUEZ | MALE | 37 | 04/15/2014 | CANCER | 3 |
| 10 | WILSON | FEMALE | 43 | 06/01/2014 | CANCER | 3 |
| 11 | MARTINEZ | FEMALE | 60 | 03/12/2014 | CANCER | 3 |
| 12 | ANDERSON | MALE | 34 | 03/21/2014 | CANCER | 3 |
| 13 | ~~TAYLOR~~ | ~~MALE~~ | ~~56~~ | ~~04/05/2013~~ | ~~CANCER~~ | 4 |
| 14 | ~~THOMAS~~ | ~~FEMALE~~ | ~~29~~ | ~~04/20/2013~~ | ~~CANCER~~ | 4 |
| 15 | ~~HERNANDEZ~~ | ~~MALE~~ | ~~45~~ | ~~05/15/2013~~ | ~~CANCER~~ | 4 |
| 16 | ~~MOORE~~ | ~~MALE~~ | ~~51~~ | ~~09/11/2013~~ | ~~CANCER~~ | 4 |

| ID | FAMILY NAME | GENDER | AGE | OPERATION DATE | DISORDER | CLUSTER |
|---|---|---|---|---|---|---|
| 1 | SMITH | MALE | 15 | 07/12/2015 | CANCER | 1 |
| 2 | JOHNSON | MALE | 16 | 08/01/2015 | CANCER | 2 |
| 3 | WILLIAMS | MALE | 29 | 07/15/2015 | CANCER | 3 |
| 4 | BROWN | FEMALE | 25 | 09/15/2015 | CANCER | 1 |
| 5 | JONES | FEMALE | 33 | 07/27/2016 | CANCER | 1 |
| 6 | MILLER | FEMALE | 39 | 03/15/2016 | CANCER | 2 |
| 7 | DAVIS | FEMALE | 25 | 04/21/2016 | CANCER | 3 |
| 8 | GARCIA | MALE | 34 | 05/01/2016 | CANCER | 2 |
| 9 | RODRIGUEZ | MALE | 37 | 04/15/2014 | CANCER | 1 |
| 10 | WILSON | FEMALE | 43 | 06/01/2014 | CANCER | 2 |
| 11 | MARTINEZ | FEMALE | 60 | 03/12/2014 | CANCER | 3 |
| 12 | ANDERSON | MALE | 34 | 03/21/2014 | CANCER | 3 |
| 13 | TAYLOR | MALE | 56 | 04/05/2013 | CANCER | 1 |
| 14 | THOMAS | FEMALE | 29 | 04/20/2013 | CANCER | 2 |
| 15 | HERNANDEZ | MALE | 45 | 05/15/2013 | CANCER | 3 |
| 16 | MOORE | MALE | 51 | 09/11/2013 | CANCER | 1 |
| 17 | MARTIN | FEMALE | 46 | 09/21/2012 | CANCER | 1 |
| 18 | JACKSON | MALE | 70 | 10/11/2012 | CANCER | 2 |
| 19 | THOMPSON | FEMALE | 49 | 11/01/2012 | CANCER | 3 |
| 20 | WHITE | MALE | 52 | 11/15/2012 | CANCER | 2 |

DATA ANONYMITY

BACKGROUND

The present invention relates to data anonymity, and more specifically, to a technique for ensuring anonymity of data.

Due to the rapid progress in information technologies, organizations such as companies can nowadays collect and store huge amounts of data in database. For the huge amount of data, automatic or semiautomatic tools which employ data mining techniques have been widely used in order to support data analysis. However, the public become more concerned with a privacy problem. Accordingly, companies need to compromise privacy of data.

The existing techniques of anonymization include the k-anonymization. The k-anonymization is a privacy-preserving approach for minimizing the information loss caused by the k-anonymization.

In a medical field, the digitization of medical charts has been widely performed in recent years, especially, in a large medical institution. Medical data including electronic medical charts is daily updated by entering and leaving hospital.

In some cases, tracing time-series changes is intended to be performed also on the data having been subjected to k-anonymization at certain period intervals. For example, it is desired to trace data taken before and after the onset of a disease. However, tracing the consistency of the data has the risk of losing the anonymity of the data because of a decrease in members of a cluster.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

According to one aspect of an embodiment of the present invention, the embodiment of the present invention provides a computer-implemented method for ensuring anonymity of data. The method comprises the followings: determining the number of members of each cluster, based on one or more features of leaving of the members of the data; and anonymizing the data, using the determined number.

According to another aspect of an embodiment of the present invention, a system, such as a computer system, comprising a computer readable storage medium storing a program of instructions executable by the computer system to perform one or more methods described herein also may be provided.

According to another aspect of an embodiment of the present invention, a computer program product comprising a computer readable storage medium storing a program of instructions executable by the computer system to perform one or more methods described herein also may be provided.

These and other features and advantages of the present invention will be described in, or will become apparent to those of ordinary skill in the art in view of, the following detailed description of the example embodiments of the present invention.

BRIEF DESCRIPTION OF THE DRAWINGS

The disclosure will provide details in the following description of preferred embodiments with reference to the following figures.

FIG. 2 illustrates an example of data for explaining an embodiment of the present invention.

FIGS. 3A to 3C illustrate an embodiment of ensuring anonymity of data in a case where the data described in FIG. 2 is used.

FIGS. 4A to 4C illustrate another embodiment of ensuring anonymity of data in a case where the data described in FIG. 2 is used.

FIGS. 5A to 5C illustrate further another embodiment of ensuring anonymity of data in a case where the data described in FIG. 2 is used.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the exemplified definitions are provided hereinafter, but the meaning of the terms should be interpreted broadly as known to the technical field to which the present invention relates.

The term, "data", may refer to any data stored in storage. For example, the data may be obtained from a database or obtained from each of devices, such as IoT devices. The database may refer to any database which is an organized collection of data. The database may have a series data group whose population decreases with a lapse of time. The database may include personal information or important information for an organizer.

The term, "anonymization", may refer to a technique for information sanitization whose intent is a privacy protection. The anonymization may prevent privacy leakage or against identifying individuals. The k-anonymization is an example of the anonymization. It requires each record in a table is indistinguishable from at least k–1 other records. Therefore privacy related information cannot be revealed from k-anonymity protected table. In the k-anonymization, clustering is a useful technique that partitioning records into clusters such that records within a cluster are similar to each other, while records in different clusters are most distinct from one another. Accordingly, the clustering can be used for the k-anonymization.

Figure 1:
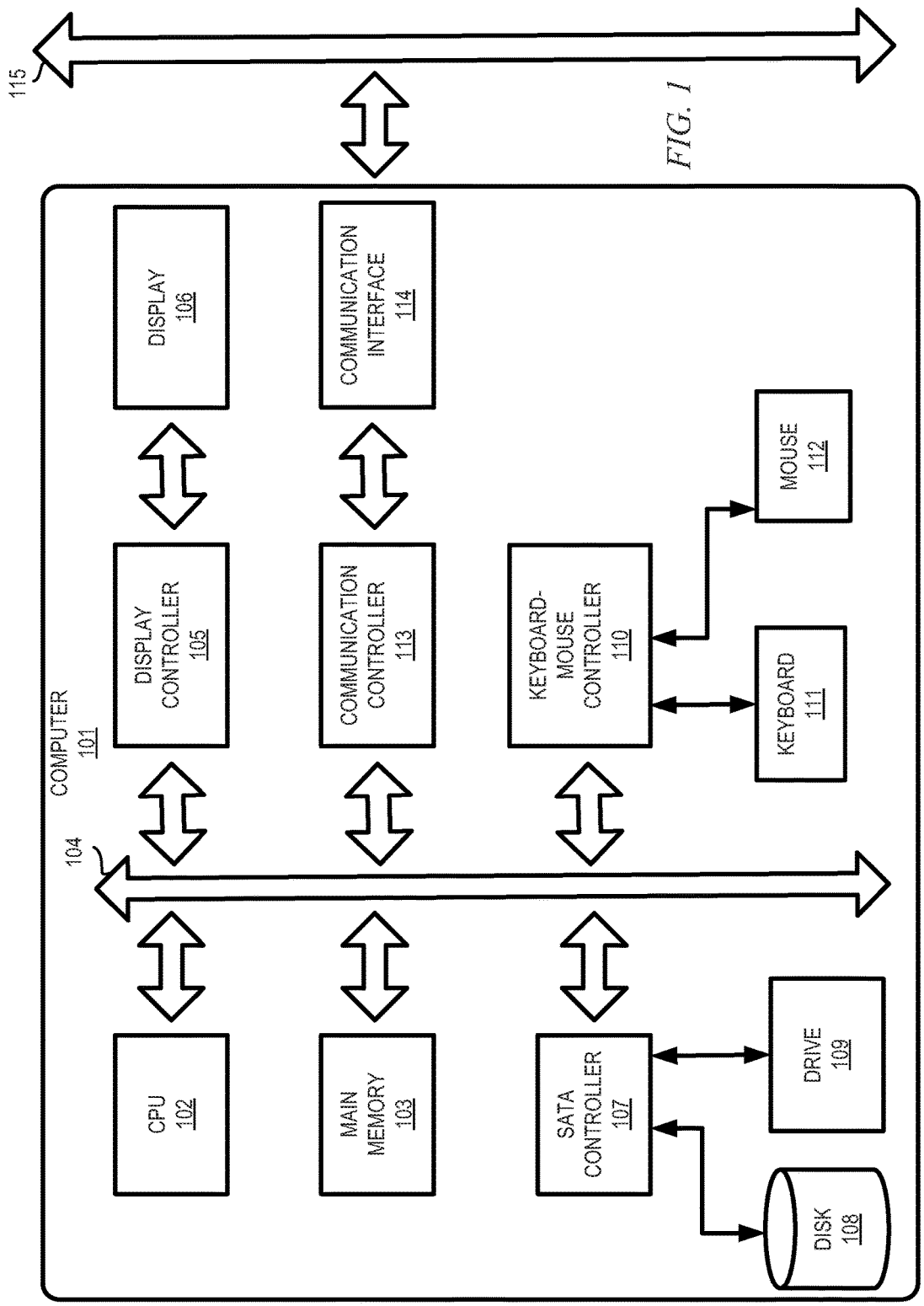
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, laptop, notebook or server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron™ series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, a LCD, PDP, OEL or a projection type display. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE®802.11a/b/g/n ("IEEE" is a registered trademark of Institute of Electrical and Electronics Engineers, Inc. in the United States, other countries, or both).

Hereinafter, an embodiment of the present invention will be described with reference to the following FIG. 2, FIGS. 3A to 3C, FIGS. 4A to 4C, FIGS. 5A to 5C, FIGS. 6 to 7 and FIG. 8.

The idea of an embodiment of the present invention is on the basis of the following perceptions:

In some cases, there is a need to trace, at certain period intervals, time-series changes on data which was subjected to k-anonymization. For example, there is need to validate data before or after disease onset.

However, there is a risk that the anonymity of the data will be lost due to the decrease in members of a cluster.

Accordingly, there is need to maintain the data continuity and to ensure anonymity of data even after X years, based on the k-anonymization with clustering method.

With reference now to FIG. 2, FIG. 2 illustrates an example of data for explaining an embodiment of the present invention.

Let us suppose that the data is stored in a database and the database for storing data relating to patients is prepared and then stored in a storage. The table (201) has twenty records which were selected by calculating each distance of data, based on information on a type of a cancer, and then selecting records of which distance are adjacent with each other.

The table (201) is to be k-anonymized. Each record has the following: family name; gender, age, operation date and disorder.

In this table (201), let us suppose the following:
a patient will see a doctor for follow-up care five years after surgery of a cancer, while the patient will not go to a hospital after five years after the surgery; and
no new data can be available after the patient will not go to the hospital.

The new data may be, for example, but not limited to, a presence or absence of side effects of anticancer drugs.

Under such assumption, three examples of clustering will be explained below by referring to each of FIGS. 3A to 3C, FIGS. 4A to 4C and FIGS. 5A to 5C. In these three examples, let us suppose that the timing of discharging from the hospital is five years after the surgery; 20% of patients are discharged from the hospital; and the clustering is made such that the number of members in each cluster is three or more after three years.

Hereinafter three embodiments of the present invention are explained by referring to FIGS. 3A to 3C, FIGS. 4A to 4C and FIG. 5A to 5C mentioned below.

With reference now to FIGS. 3A to 3C, FIGS. 3A to 3C illustrate an embodiment of ensuring anonymity of data in a case where the data described in FIG. 2 is used.

Let us suppose that the data is stored in a database.

The table (201) is used for this embodiment.

In this example, the following assumptions (1) and (2) are set to:
(1) every year, [Z]=20% of patients are discharged from the hospital; and
(2) after [X]=3 years, the value of k for the k-anonymization is [Y]=3.

In order to maintain data consistency even after [X] years without losing the anonymity of the data, a minimum value [N] of the number of members in each cluster for the database at the present time is calculated using the following formula:

$$\frac{Y}{(1-Z\%)^x} + \alpha \leq N$$

where α is a constant of zero or more in order to deal with variations of rate of discharge from the hospital among the members of each cluster.

In a case where α is set to 4, the minimum value [N] is calculated as 10, as seen below:

$$N = \frac{3}{(1-20\%)^x} + \alpha = 5.86 + \alpha$$

Accordingly, the number of cluster is calculated as 2 (=20/10).

After the calculation, each of the members in the table (201) is randomly assigned to either cluster 1 or cluster 2.

As seen in the table (301) described in FIG. 3A, the clusters 1 and 2 are generated after the calculation. In the table (301), a unique ID is assigned to each record only for ease of explanations. After the clustering, the k-anonymization will be applied for the table (301).

As seen in the table (302) described in the FIG. 3B, four records to which the IDs 17 to 20 are deleted after one year according to the above-mentioned assumption (1). After the deletion, the k-anonymization will be applied for the table (302) after the deletion of the above mentioned four records. The k-anonymization is done by setting k=N on the database at the present time in order to prevent the identification of an individual.

As seen in the table (303) described in FIG. 3C, four records to which the IDs 13 to 16 are deleted after two years according to the above-mentioned assumption (1). After the deletion, the k-anonymization will be applied for the table (303) after the deletion of the above mentioned four records.

The process according to the embodiment mentioned above may be performed according to the flowchart described in FIG. 6 mentioned below.

Figure 4B:

With reference now to FIGS. 4A to 4C, FIGS. 4A to 4C illustrate another embodiment of ensuring anonymity of data in a case where the data described in FIG. 2 is used.

Let us suppose that the data is stored in a database.

The table (201) is used for this other embodiment.

In this example, the following assumptions (3) and (4) are set to:
(3) the database has operation date for each patient: and
(4) After [X]=3 years, the value of k for the k-anonymization is [Y]=3.

In order to maintain data consistency even after [X] years without losing the anonymity of the data, a minimum value [N] of the number of members in each cluster for the database at the present time is calculated using the following formula:

$$Y + \alpha \leq N$$

where α is a constant of zero or more in order to deal with variations of rate of discharge from the hospital among the members of each cluster.

In a case where α is set to 1, the minimum value [N] is calculated as 4, as seen below:

$$N \geq 3 + \alpha$$

Accordingly, the number of cluster is calculated as 5 (=20/4).

After the calculation, each of the members in the table (201) is assigned to any one of clusters 1 to 5, according to the operation date. Persons whose operation date is closer with each other are clustered as members of a common cluster.

As seen in the table (401) described in FIG. 4A, the clusters 1 to 5 are generated after the calculation. In the table (401), a unique ID is assigned to each record only for ease of explanations. After the clustering, the k-anonymization will be applied for the table (401). The k-anonymization is done by setting k=N on the database at the present time in order to prevent the identification of an individual.

As seen in the table (402) described in the FIG. 4B, four records to which the IDs 17 to 20 are deleted after one year according to the operation date. After the deletion, the k-anonymization will be applied for the table (402) after the deletion of the above mentioned four records.

As seen in the table (403) described in FIG. 4C, four records to which the IDs 13 to 16 are deleted after two years according to the operation date. After the deletion, the k-anonymization will be applied for the table (403) after the deletion of the above mentioned four records.

The process according to another embodiment mentioned above may be performed according to the flowchart described in FIG. 7 mentioned below.

Figure 5B:
Figure 5C:

With reference now to FIGS. 5A to 5C, FIGS. 5A to 5C illustrate further another embodiment of ensuring anonymity of data in a case where the data described in FIG. 2 is used.

Let us suppose that the data is stored in a database.

The table (201) is used for this embodiment.

In this example, the following assumptions (5) to (7) are set to:
(5) the database has operation date for each patient;
(6) every year, [Z]=20% of patients are discharged from the hospital; and
(7) after [X]=3 years, the value of k for the k-anonymization is [Y]=3.

In order to maintain data consistency even after [X] years without losing the anonymity of the data, a minimum value [N] of the number of members in each cluster for the database at the present time is calculated using the following formula:

$$\frac{Y}{(1-Z\%)^x} + \alpha \leq N$$

where α is a constant of zero or more in order to deal with variations of rate of discharge from the hospital among the members of each cluster.

In a case where α is set to 0.1, the minimum value [N] is calculated as 6, as seen below:

$$N = \frac{3}{(1-20\%)^x} + \alpha = 5.86 + \alpha$$

Accordingly, the number of cluster is calculated as 7 or 6 (=20/6).

After the calculation, each of the members in the table (201) is assigned to any one of clusters 1 to 3, according to the operation date. Persons whose operation date is different with each other are clustered as members of a common cluster.

As seen in the table (501) described in FIG. 5A, the clusters 1 to 5 are generated after the calculation. In the table (501), a unique ID is assigned to each record only for ease of explanations. After the clustering, the k-anonymization will be applied for the table (501). The k-anonymization is done by setting k=N on the database at the present time in order to prevent the identification of an individual.

As seen in the table (502) described in the FIG. 5B, four records to which the IDs 17 to 20 are deleted after one year according to the operation date. After the deletion, the k-anonymization will be applied for the table (502) after the deletion of the above mentioned four records.

As seen in the table (503) described in FIG. 5C, four records to which the IDs 13 to 16 are deleted after two years according to the operation date. After the deletion, the k-anonymization will be applied for the table (503) after the deletion of the above mentioned four records.

The process according to the further another embodiment mentioned above may be performed according to the flowchart described in FIG. 7 mentioned below.

Hereinafter three embodiment of the flowchart are explained by referring to FIGS. 6, 7 and 8 mentioned below.

Figure 6:
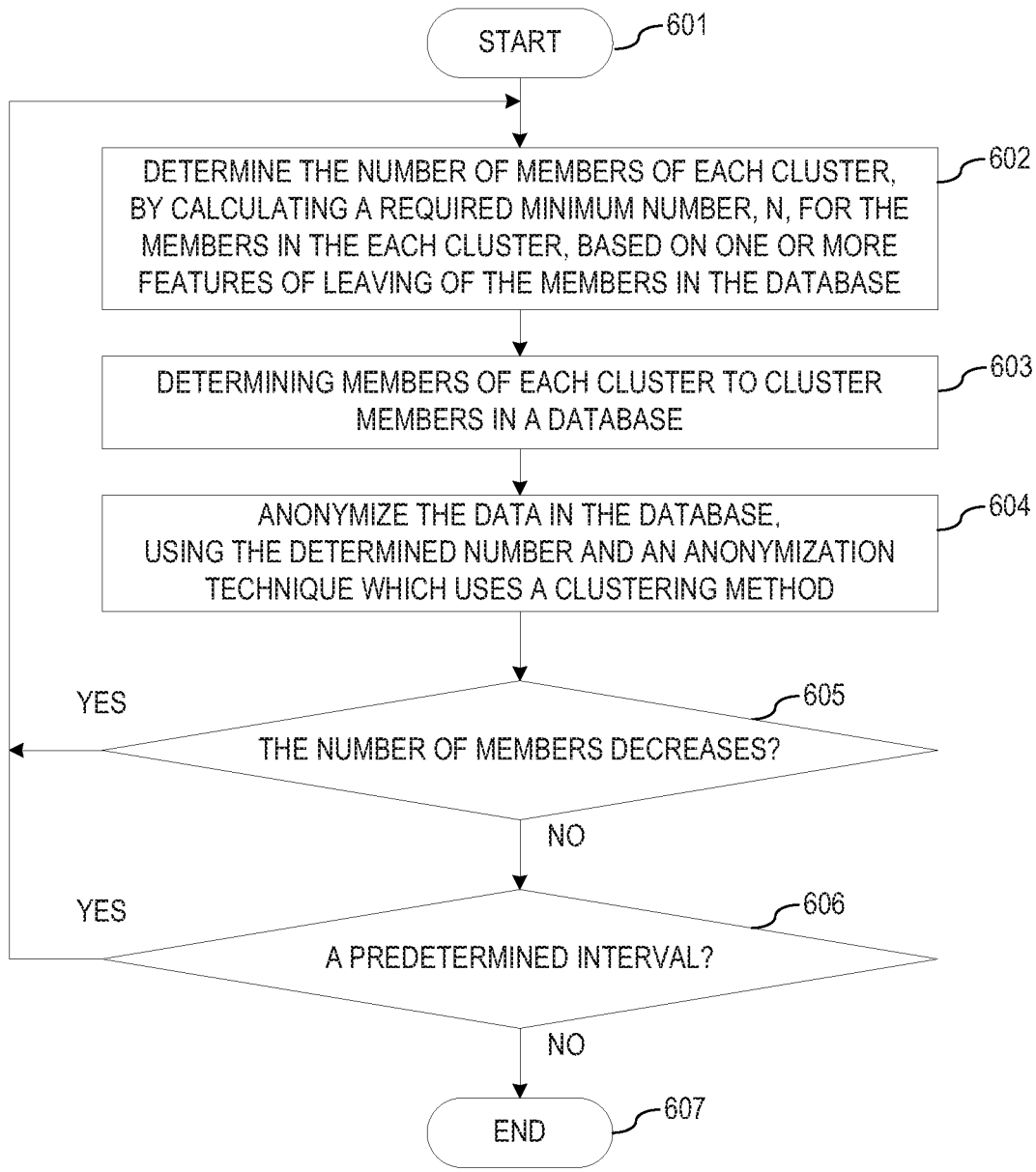
FIG. 6 illustrates an embodiment of a flowchart of a process for ensuring anonymity of data.

With reference now to FIG. 6, FIG. 6 illustrates an embodiment of a flowchart of a process for ensuring anonymity of data.

Let us suppose that the data is stored in a database.

In step 601, the computer starts the process mentioned above.

In step 602, the computer determines the number of members of each cluster, based on one or more features of leaving of the members in the database. The term, "leaving", according to an embodiment of the present invention may refer to a status being excluded from a member of a cluster. A reason for the leaving is, for example, that data remains in a database, but data relating to the member is not updated.

The one or more features of leaving may be a ratio of leaving, a period for leaving, a cause of leaving, or a combination thereof. An example of the cause of leaving may be, for example, but not limited to, a change of an address far away from an address before moving, a hospital transfer, or a death in a case where the database stores data relating to patients.

The determination may be made by calculating a required minimum number, N, for the members in the each cluster, based on the one or more features of leaving of the members in the database.

In the database, assuming that the value, k, for the k-anonymization is Y after a passage of a first predefined term, X, and the members of Z % leaves in each second predefined term, the required minimum number, N, may be calculated based on the above mentioned X, Y and Z. Under this assumption, the features of leaving of the members in the database may be a ratio of leaving.

The required minimum number, N, may be calculated according to the following equation:

$$\frac{Y}{(1-Z\%)^x} + \alpha \leq N,$$

wherein $\alpha$ is a constant value of zero or more.

In step 603, the computer determines members of each cluster, based on one or more features of leaving of the members of the data.

In one embodiment, the determination may be made by randomly selecting the members for each cluster.

In another embodiment, the determination may be made by selecting members whose period for leaving is in a predefined threshold as members of a cluster. For example, the determination may comprise making members whose leaving time is close with each other among the members of each cluster as members of a common cluster. The predefined threshold may be determined, for example, by a manager of the database.

In further another embodiment, the determination may be made by selecting members whose period for leaving is outside a predefined threshold as members of a cluster. For example, the determination may comprise making members whose leaving time is different from each other among the members of each cluster as members of a common cluster. The predefined threshold may be determined, for example, by a manager of the database.

In step 604, the computer anonymizes the data in the database, using the determined number. The anonymization may be made using the determined number together with an anonymization technique. The anonymization may be performed using k-anonymization with k being the required minimum number, N.

In step 605, the computer judges whether the number of the members of the cluster decreases or not. If the judgment is positive, the computer proceeds back to step 602 in order to repeat steps 602 to 604. In a repeating step 602, the data for members who exist now may be selected from the database at the past time. Meanwhile, if the judgment is negative, the computer proceeds to step 606.

In step 606, the computer judges whether a predetermined interval passes or not. The predetermined interval may be determined, for example, by a manager of the database. If the judgment is positive, the computer proceeds back to step 602 in order to repeat steps 602 to 604. Meanwhile, if the judgment is negative, the computer proceeds to a final step 607.

In step 607, the computer terminates the process mentioned above.

According to the embodiment, identification of an individual can be prevented and, accordingly, anonymity of data can be ensured.

Figure 7:
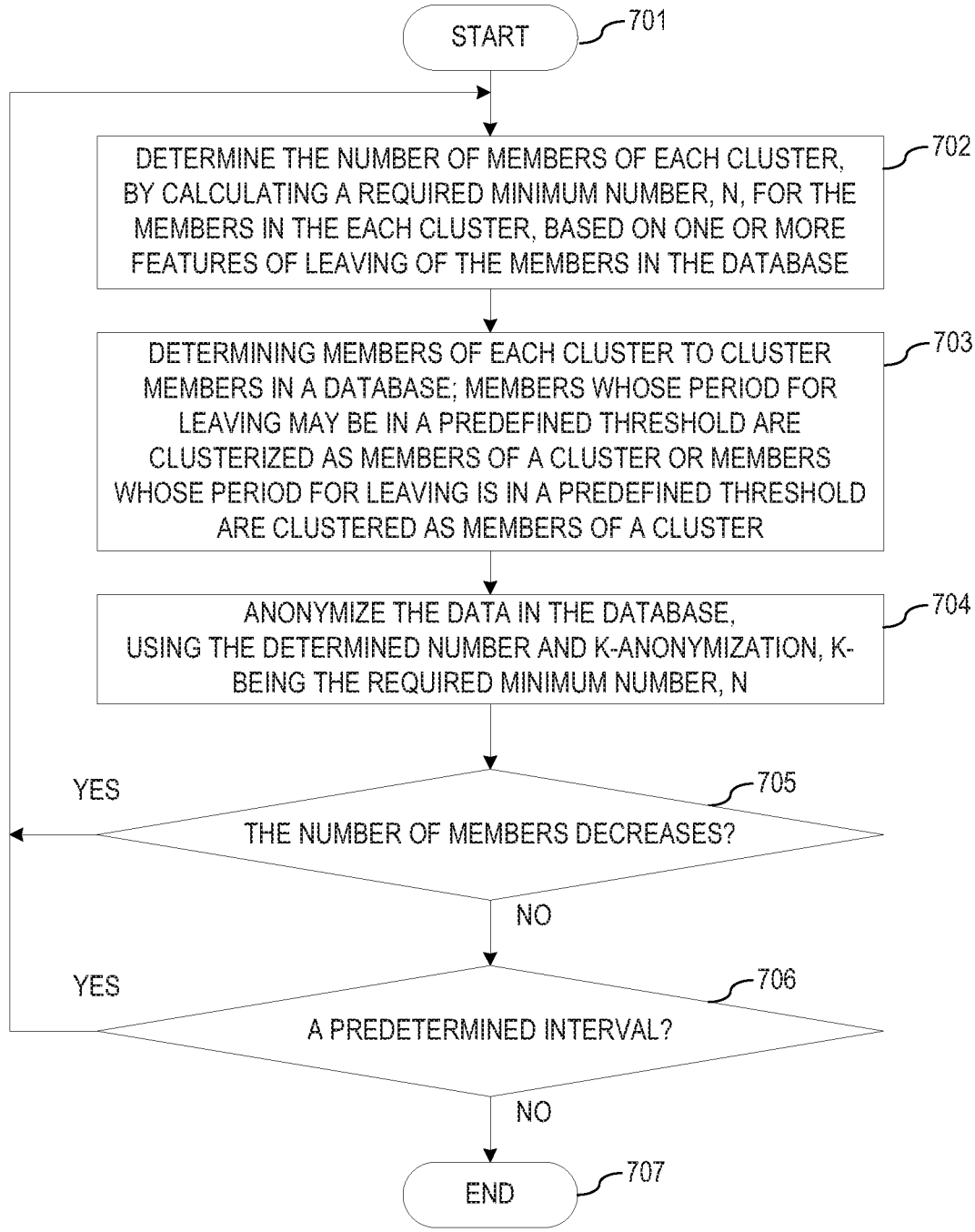
FIG. 7 illustrates another embodiment of a flowchart of a process for ensuring anonymity of data.

With reference now to FIG. 7, FIG. 7 illustrates another embodiment of a flowchart of a process for ensuring anonymity of data.

Let us suppose that the data is stored in a database.

In step 701, the computer starts the process mentioned above.

In step 702, the computer determines the number of members of each cluster, based on one or more features of leaving of the members in the database.

A stated above, the one or more features of leaving may be a ratio of leaving, a period for leaving, a cause of leaving, or a combination thereof.

The determination may be made by calculating a required minimum number, N, for the members in the each cluster, based on the one or more features of leaving of the members in the database.

In the database, assuming that the value, k, for the k-anonymization is Y after a passage of a first predefined term, X, and the required minimum number, N, may be calculated based on the above mentioned Y. Under this assumption, the features of leaving of the members in the database may be a period for leaving, which may be stored in the database. The database may have a period for leaving for each member.

The required minimum number, N, may be calculated according to the following equation:

$$Y + \alpha \leq N,$$

wherein α is a constant value of zero or more.

In step 703, the computer determines members of each cluster, based on one or more features of leaving of the members in the database.

In one embodiment, the determination may be made by selecting members whose period for leaving is in a predefined threshold as members of a cluster.

In step 704, the computer anonymizes the data in the database, using the determined number. The anonymization may be made using the determined number together with an anonymization technique. The anonymization may be performed using k-anonymization with k being the required minimum number, N.

In step 705, the computer judges whether the number of the members of the cluster decreases or not. If the judgment is positive, the computer proceeds back to step 702 in order to repeat steps 702 to 704. In a repeating step 602, the data for members who exist now may be selected from the database at the past time. Meanwhile, if the judgment is negative, the computer proceeds to step 706.

In step 706, the computer judges whether a predetermined interval passes or not. The predetermined interval may be determined, for example, by a manager of database. If the judgment is positive, the computer proceeds back to step 702 in order to repeat steps 702 to 704. Meanwhile, if the judgment is negative, the computer proceeds to a final step 707.

In step 707, the computer terminates the process mentioned above.

In the embodiment mentioned above, the database can be maintained during X years after the generation of clusters in order to update information of members. The update allows a management of a data consistency so as to make the data traceable while keeping anonymity of the database for X years from arbitrary time point.

According to the embodiment, identification of an individual can be prevented and, accordingly, anonymity of data can be ensured.

Figure 8:
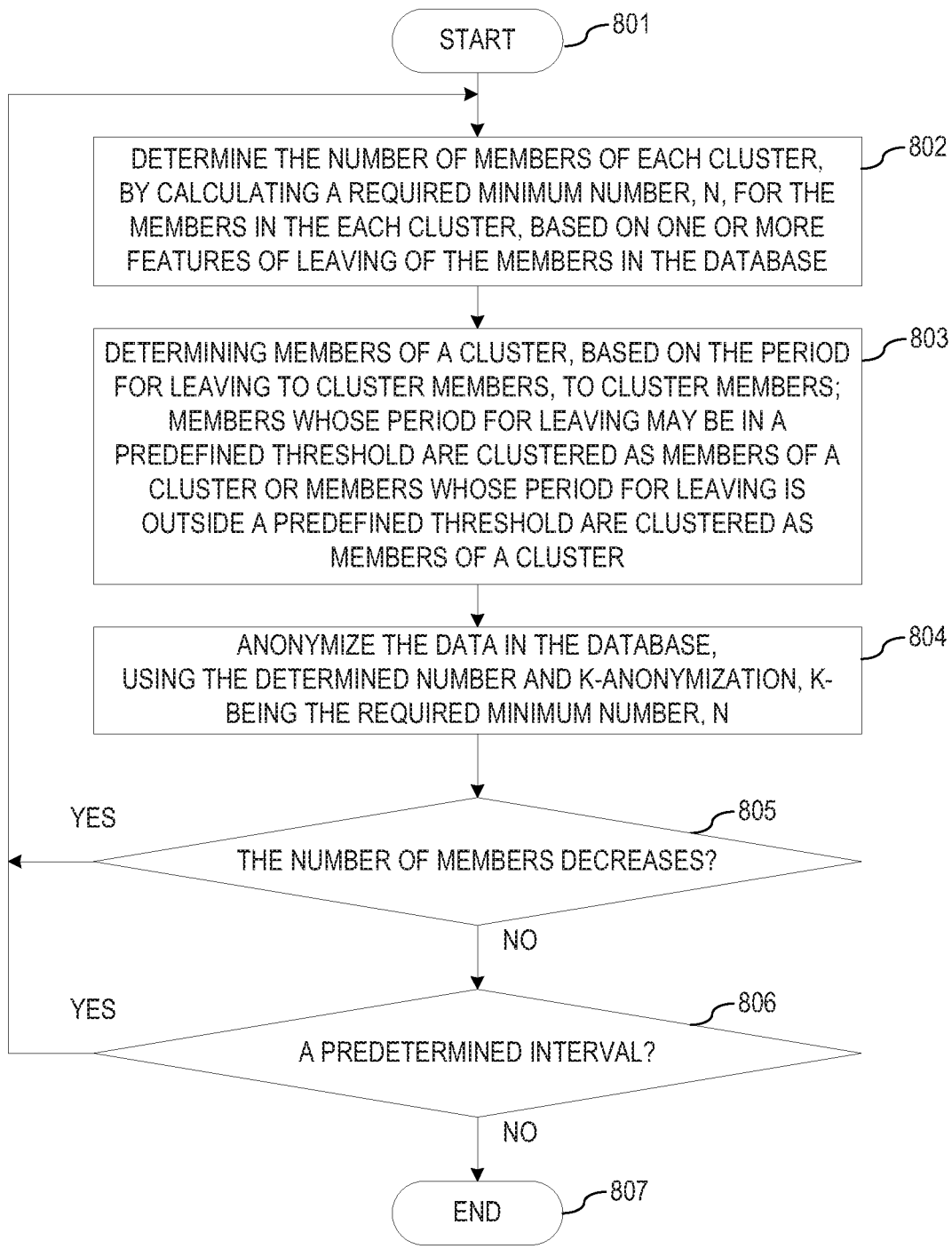
FIG. 8 illustrates further another embodiment of a flowchart of a process for ensuring anonymity of data.

With reference now to FIG. 8 FIG. 8 illustrates further another embodiment of a flowchart of a process for ensuring anonymity of data.

Let us suppose that the data is stored in a database.

In step 801, the computer starts the process mentioned above.

In step 802, the computer determines the number of members of each cluster, based on one or more features of leaving of the members in the database.

A stated above, the one or more features of leaving may be a ratio of leaving, a period for leaving, a cause of leaving, or a combination thereof.

The determination may be made by calculating a required minimum number, N, for the members in the each cluster, based on the one or more features of leaving of the members in the database.

In the database, assuming that the value, k, for the k-anonymization is Y after a passage of a first predefined term, X, and the members of Z % leaves in each second predefined term, the required minimum number, N, may be calculated based on the above mentioned X, Y and Z. Under this assumption, the features of leaving of the members in the database may be a period for leaving, which may be stored in the database, and a ratio of leaving. The database may have a period for leaving for each member.

The required minimum number, N, may be calculated according to the following equation:

$$\frac{Y}{(1-Z\%)^X} + \alpha \leq N,$$

wherein α is a constant value of zero or more.

In step 803, the computer determines members of each cluster, based on one or more features of leaving of the members in the database.

In one embodiment, the determination may be made by selecting members whose period for leaving is outside a predefined threshold as members of a cluster. The predefined threshold may be determined, for example, by a manager of the database.

In step 804, the computer anonymizes the data in the database, using the determined number. The anonymization may be made using the determined number together with an anonymization technique. The anonymization may be performed using k-anonymization with k being the required minimum number, N.

In step 805, the computer judges whether the number of the members of the cluster decreases or not. If the judgment is positive, the computer proceeds back to step 802 in order to repeat steps 802 to 804. In a repeating step 802, the data for members who exist now may be selected from the database at the past time. Meanwhile, if the judgment is negative, the computer proceeds to step 806.

In step 806, the computer judges whether a predetermined interval passes or not. The predetermined interval may be determined, for example, by a manager of the database. If the judgment is positive, the computer proceeds back to step 802 in order to repeat steps 802 to 804. Meanwhile, if the judgment is negative, the computer proceeds to a final step 807.

In step 807, the computer terminates the process mentioned above.

In the embodiment mentioned above, the database can be maintained during X years after the generation of clusters in order to update information of members. The update allows a management of a data consistency so as to make the data traceable while keeping anonymity of the database for X years from arbitrary time point.

According to the embodiment, identification of an individual can be prevented and, accordingly, anonymity of data in a database can be ensured.

Figure 9:
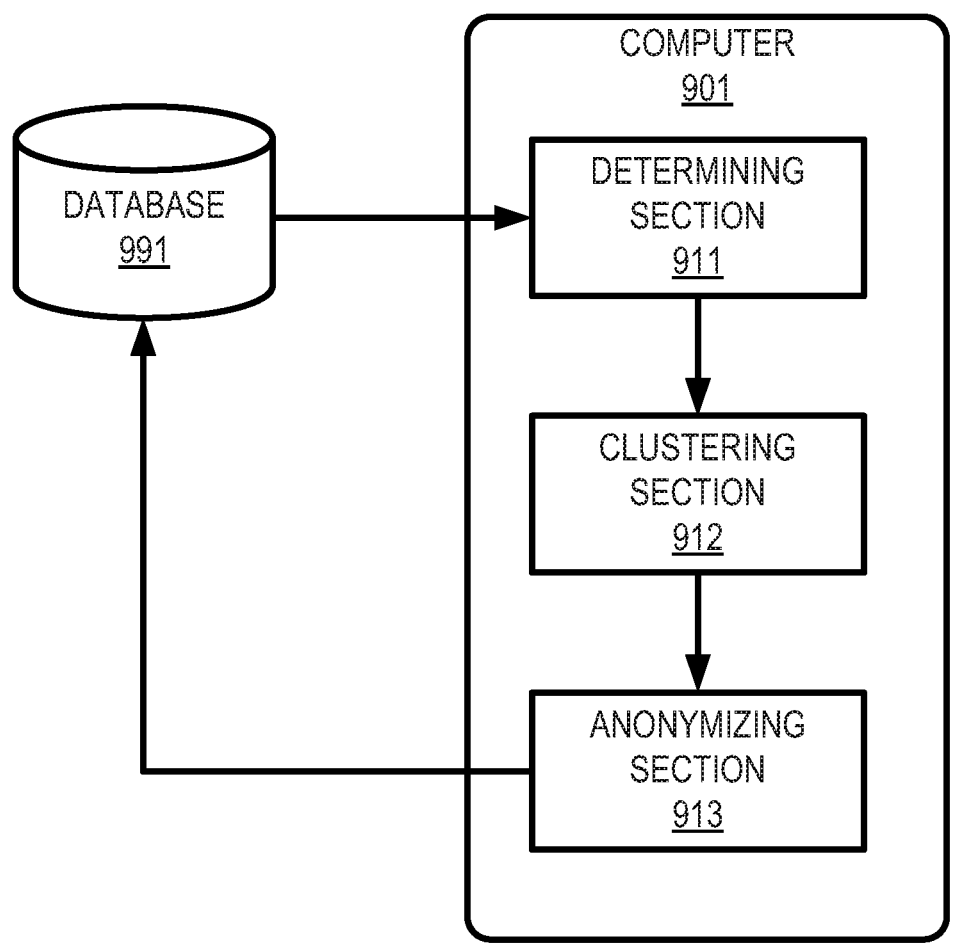
FIG. 9 illustrates an embodiment of an overall functional block diagram of a system hardware used in accordance with the embodiment of the overall flowchart described in FIGS. 6 to 8.

With reference now to FIG. 9, FIG. 9 illustrates an embodiment of an overall functional block diagram of a system hardware used in accordance with the embodiment of the overall flowchart described in FIGS. 6 to 8.

A computer (901) corresponds to the computer (101) described in FIG. 1. The computer (901) can access a database (991) which comprises data to be ensured according to an embodiment of the present invention.

The computer (901) may comprise a determining section (911), a clustering section (912) and an anonymizing section (913).

The determining section (911) may determine the number of members of each cluster, based on one or more features of leaving of the members of the data.

The determining section (911) may perform step 602 described in FIG. 6, step 702 described in FIG. 7, and step 802 described in FIG. 8.

The clustering section (912) may determine members of each cluster to cluster members in a database.

The clustering section (912) may perform step 603 described in FIG. 6, step 703 described in FIG. 7, and step 803 described in FIG. 8.

The anonymizing section (913) may anonymize the data in the database, using the determined number.

The anonymizing section (913) may perform step 604 described in FIG. 6, step 704 described in FIG. 7, and step 804 described in FIG. 8.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transparent media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transparent cables, optical transparent fibers, wireless transparent, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

What is claimed is:

1. A system, comprising:
   a memory storing a program which, when executed on a processor, performs an operation for ensuring anonymity of data, the operation comprising:
   determining a number of members of each of a plurality of clusters, based on one or more features of members leaving the cluster; and
   anonymizing the data in the database, easing the determined number of members of each cluster, wherein the one or more features of the leaving members from the cluster are selected from the group consisting of a ratio of leaving, a period for leaving, a cause of leaving, or a combination thereof; wherein the database has the period for leaving for each member; wherein the determination is made by calculating a required minimum number, N, for the members in each cluster, based on the ratio of leaving; wherein the anonymization is performed using k-anonymization with k being the retired minimum number, N, and wherein, in the database, assuming that the value, k, for the k-anonymization is Y after a passage of a first predefined term, X, the required minimum number, N, is calculated based on Y.

2. The system according to claim 1, wherein after the program instructions cause the computer to determine the number of members of each cluster, the program instructions further cause the computer to cluster members whose period for leaving is in a predefined threshold as members of the cluster.

3. The system according to claim 1, wherein after the program instructions cause the computer to determine the number of members of each cluster, the program instructions further cause the computer to cluster members whose period for leaving is outside a predefined threshold as members of the cluster.

4. The system according to claim 1, wherein the program instructions further cause the computer to:
   repeat the program instructions to determine and anonymize in a predetermined interval or in response to decrease of the number of the members of the cluster.

5. The system according to claim 1, wherein, in the database, assuming that the members of Z % leaves in each second predefined term, the required minimum number, N, is calculated based on X, Y and Z.

6. The system according to claim 5, wherein the required minimum number, N, is calculated according to the following equation:

$$\frac{Y}{(1-Z\%)^x} + \alpha \leq N,$$

wherein α is a constant value of zero or more.

7. The system according to claim 1, wherein the required minimum number, N, is calculated according to the following equation:

$$Y + \alpha \leq N,$$

wherein α is a constant value of zero or more.

8. A computer program product for ensuring anonymity of data, the computer program product comprising a computer readable storage medium having program instructions embodied therewith, wherein the computer readable storage medium is not a transitory signal per se, the program instructions executable by a computer to cause the computer to:
   determine a number of members of each of a plurality of clusters, based on one or more features of members leaving the cluster; and
   anonymize the data in the database, using the determined number of members of each cluster, wherein the one or more features of the leaving members from the cluster are selected from the group consisting of a ratio of leaving, a period for leaving, a cause, of leaving, or a combination thereof; wherein the database has the period for leaving for each member; wherein the determination is made by calculating a required minimum number, N, for the members in each cluster, based on the ratio of leaving; wherein the anonymization is performed using k-anonymization with k being the required minimum number, N; and wherein, in the database, assuming that the value, k for the k-anonymization is Y after a passage of a first predefined term, X, the required minimum number, N, is calculated based on Y.

9. The computer program product according to claim 8, wherein after the program instructions cause the computer to determine the number of members of each cluster, the program instructions further cause the computer to cluster members whose period for leaving is in a predefined threshold as members of the cluster.

10. The computer program product according to claim 8, wherein after the program instructions cause the computer to determine the number of members of each cluster, the program instructions further cause the computer to cluster members whose period for leaving is outside a predefined threshold as members of the cluster.

11. The computer program product according to claim 8, wherein the program instructions further cause the computer to:
   repeat the program instructions to determine and anonymize in a predetermined interval or in response to decrease of the number of the members of the cluster.

12. The computer program product according to claim 8, wherein, in the database, assuming that the members of Z % leaves in each second predefined term, the required minimum number, N, is calculated based on X, Y and Z.

13. The computer program product according to claim 12, wherein the required minimum number, N, is calculated according to the following equation:

$$\frac{Y}{(1-Z\%)^x} + \alpha \leq N,$$

wherein α is a constant value of zero or more.

14. The computer program product according to claim 8, wherein the required minimum number, N, is calculated according to the following equation:

$$Y+\alpha \leq N,$$

wherein α is a constant value of zero or more.

\* \* \* \* \*